United States Patent [19]

Erchoff

[11] 3,950,087

[45] Apr. 13, 1976

[54] SLIDE PROJECTOR FOR RECEIVING ALTERNATE SLIDE TRAYS OF DIFFERENT CONFIGURATIONS

[75] Inventor: Jean-Paul Erchoff, Belsele, Belgium

[73] Assignee: GAF Corporation, New York, N.Y.

[22] Filed: Feb. 11, 1975

[21] Appl. No.: 549,027

Related U.S. Application Data

[63] Continuation of Ser. No. 376,181, July 3, 1973, abandoned.

[52] U.S. Cl. ............................... 353/116; 353/117
[51] Int. Cl.² ................... G03B 23/04; G03B 23/06
[58] Field of Search ........... 353/103, 104, 114, 116, 353/117

[56] References Cited
UNITED STATES PATENTS

| | | | |
|---|---|---|---|
| 3,359,668 | 12/1967 | Badalich | 353/117 |
| 3,554,639 | 1/1968 | Robinson | 353/117 |
| 3,572,921 | 3/1971 | Mulch | 353/117 |
| 3,704,943 | 12/1972 | Rube | 353/117 |

Primary Examiner—Houston S. Bell, Jr.
Assistant Examiner—Steven L. Stephan
Attorney, Agent, or Firm—Walter C. Kehm; Arthur Dresner

[57] ABSTRACT

A slide projector adapted to alternately receive at least two slide trays having different shapes and different indexing configurations is provided. The projector includes a slide tray receiving groove having tray guide means for slidably engaging corresponding support surfaces formed on the slide trays, and an indexing mechanism having suitable drive gears for engagement with either of the alternate trays, to incrementally advance either of said trays from one slide position to the next. The projector also includes in one embodiment slidable tray retainer means normally biased into the tray receiving groove to support the edge of one said trays to maintain the same in engagement with the indexing mechanism, and means to urge such retainer out of the tray receiving groove upon insertion therein of the other of said trays.

15 Claims, 8 Drawing Figures 3,950,087

SLIDE PROJECTOR FOR RECEIVING ALTERNATE SLIDE TRAYS OF DIFFERENT CONFIGURATIONS

This is a continuation of application Ser. No. 376,181, filed July 3, 1973, now abandoned.

BACKGROUND OF THE INVENTION

It is well known to provide slide projectors of the type having a tray receiving groove adapted to alternately receive slide trays of different configurations, and having means for indexing any such slide trays disposed in the groove from one slide position to the next, so that all of the slides in such tray may be sequentially advanced to the viewing position. In most instances, the alternate tray configurations consist of a horizontally disposed box type rectangular tray and a vertically disposed circular tray, the object being to increase the slide holding capacity by the use of the circular tray. Both such tray configurations are provided with a peripheral rack of teeth or other projections, each of which corresponds to a slide receiving space therein, and an indexing gear in the projector is adapted to operatively engage such teeth or projections on either tray to sequentially advance such tray from slide to slide. An example of a projector of this type is shown in U.S. Reissue Pat. No. Re 26,619 to Hall.

The Hall device, which is typical of projectors of this type, includes a single indexing drive gear adapted to engage the teeth of either a box tray or a circular tray. For support and guidance purposes the box type tray rests on the bottom surface of the tray receiving groove, and is held thereby in engagement with the indexing gear. In addition, a pair of spaced support lugs are provided on a side wall of the slide tray receiving groove to engage two points along the outer periphery of the circular tray, and a projection or guide surface formed on the opposite wall of the tray receiving groove holds the tray in contact with such projections. In this manner, the circular tray is properly positioned for engagement with the indexing gear. In some instances the lowermost point of the circular tray is also adapted to rest upon the bottom surface of the tray receiving groove for additional support. It should be noted that on most projectors of this type the pitch of the indexing racks formed on both the box tray and the circular tray are identical, so that the same incremental rotation of the indexing gear is adapted to advance either of said trays the appropriate distance.

Unfortunately, although the foregoing described projectors are in widespread use, they are generally acceptable for use only with slide trays manufactured specifically for a particular projector, and are incapable of use with alternate slide trays having different support and indexing configurations. Accordingly, if an individual has one or more slide trays produced by one manufacturer, such trays generally cannot be utilized in a slide projector produced by another manufacturer. In addition, in some instances circular trays and box type trays produced by the same manufacturer cannot be utilized in a single projector produced by the same manufacturer because each of such trays has different support and indexing requirements. To overcome this deficiency, some manufacturers have provided removable adaptors to be positioned within the tray receiving groove for supporting either the box tray or the circular tray. Such adaptors may also include a reduction gear network which provides a drive linkage between a main indexing gear, which is adapted to normally engage one of said trays, and the indexing rack of the alternate tray, so that each of said trays is advanced the appropriate distance from slide to slide.

An example of a removable adaptor for the purpose of accommodating a circular tray in a projector normally adapted for use with a box tray is disclosed in U.S. Pat. No. 3,572,921 to Mulch. The Mulch adaptor permits the alternate use of box trays and circular trays of different configurations within the same slide projector. However, the adaptor is quite inconvenient to use, costly to construct, and can in many instances cause jamming of one of the two slide trays if it is not properly installed. Furthermore, the Mulch device comtemplates the use of a box tray and circular tray produced by the same manufacturer for use in a specified projector also produced by the same manufacturer.

SUMMARY OF THE INVENTION

In accordance with the present invention, a slide projector adapted to alternately receive slide trays of different configurations is provided which overcomes the inconvenience and inefficiencies associated with prior devices of this type. The projector of the present invention utilizes a tray receiving groove having tray guide means formed therein for alternately supporting and guiding both circular and box type slide trays of completely different shapes and different indexing configurations without the need for a removable adaptor to support such trays. In addition, the present device also includes an indexing mechanism having suitable drive gears or pawls for engaging and incrementally advancing any of the trays installed within the tray receiving groove.

In general, the slide projector of the invention comprises, in combination, a slide tray receiving groove for alternatively holding a first slide tray having a supporting surface and a rack of indexing projections formed along one edge thereof, and a second slide tray having a supporting surface and a rack of indexing projections formed along one edge thereof having a pitch different from the pitch of the indexing rack of said first slide tray; said tray receiving groove including tray guide means having a contoured surface corresponding to and adapted to slidably engage the supporting surfaces of the first and second trays; and an indexing mechanism for incrementally advancing either said first tray or said second tray within said tray receiving groove to sequentially present slides contained in said first or said second trays for viewing; said indexing mechanism including a first rotatable drive gear adapted to engage and advance the indexing rack of said first tray, and a second rotatable drive gear operatively linked to said first drive gear and adapted to engage and advance the indexing rack of said second tray.

As an additional feature, the preferred embodiment of the slide projector invention also includes tray retaining means slidably disposed for movement perpendicular to the direction of movement of the slide trays, between an inoperative position out of the tray receiving groove and a retaining position within the tray receiving groove to support the edge of the first tray to maintain the indexing rack thereof in engagement with the first drive gear. The retaining means is normally biased into the support position within the tray receiving groove, and includes camming means for engagement with the second tray to urge such retaining means into the inoperative position upon insertion of the second tray into the tray receiving groove. In this manner, the operator of the slide projector can readily change from one type of slide tray to another merely by removing the first from, and inserting the second into, the tray receiving groove. There is no necessity to install or remove additional support means or indexing means in order to accommodate any of the slide tray configurations with which the projector is adapted to be used.

The slide tray receiving groove is generally rectangular in shape and is defined by two side walls and a bottom wall extending substantially over the entire length of the projector in a position parallel to the optical axis thereof. The tray guide means is formed as an integral part of the bottom wall of the tray receiving groove and has a contoured surface of any desired configuration corresponding to the configuration of the slide trays adapted to be disposed within the tray receiving groove. For example, the guide means can include one or more upstanding projections or ribs adapted to engage corresponding grooves in the support surface of a particular slide tray, it can have one or more flat sections for engagement with corresponding slide tray surfaces, or can include one or more grooves for engagement with corresponding downwardly extending projections formed in any of the slide trays adapted to be installed in the slide projector. It should be noted that various sections of the contoured guide means surface can be adapted for engagement with different interchangeable slide trays.

The indexing mechanism is disposed adjacent the bottom surface of the slide tray receiving groove in a manner such that the first drive gear and the second drive gear extend at least partially within such groove to engage the indexing rack of the appropriate tray. To operatively interconnect the first and second drive gears, a third intermediate gear in connection with both said first and second gears is provided. The first and second drive gears are sized accordingly to engage the indexing racks of the first and second slide trays, respectively, and are adapted to incrementally advance such trays the appropriate distance between the slide receiving spaces formed therein. The intermediate connecting gear permits both the first and second gears to rotate in the same direction, and controls the degree of rotation of the second gear with respect to the first gear, so that each slide tray is advanced the proper distance.

The slide projector also includes a slide carrier slidably disposed for reciprocating movement transversely to the slide tray receiving groove and having a slide pusher arm for transferring a slide from a slide tray installed therein to the viewing position on the optical axis of the projector and returning same to the slide tray. The slide carrier can be linked to, or include thereon, an indexing member of well known design having at least one pawl for engagement with either the first or second drive gear of the indexing mechanism upon withdrawal of the slide carrier, so as to incrementally rotate such drive gear to advance a slide tray disposed in slide tray receiving groove. It should also be noted that, alternatively, a pair of indexing pawls adapted for direct incremental engagement with the first and second slide trays can be provided instead of the drive gears. The pawls can be mounted on a common lever for engagement by the slide carrier. The slide carrier and the indexing mechanism cooperate with one another in a manner such that the slide trays can be advanced to the next slide position only after the previously viewed slide has been fully returned to its appropriate slide receiving space within such slide tray. This is accomplished by suitably positioning the pawl or pawls formed on the slide carrier indexing member with respect to the drive gears, the indexing racks on the trays and the slide pusher arm.

The slide trays that can be operatively installed in the slide projector of the invention can vary greatly in configuration. By referring to first and second slide trays it should be noted that each of such designations can include more than one type of slide tray; provided, however, that the slide trays included within each designation comprise the same support and indexing configuration. For example, the first slide tray can be either a horizontally disposed box type tray or a vertically disposed circular tray, both having the same configuration indexing racks. Similarly, the second slide tray can also be a box tray or circular tray with the same indexing racks. Furthermore, additional slide trays having indexing and support configurations different from both the first and second trays can also be adapted for use in the slide projector of the invention. To accommodate such additional trays the tray guide means is provided with the necessary contoured support surface and one or more additional drive gears are included as a part of the indexing mechanism and are operatively connected to the main drive gear.

The slidable tray retainer means is disposed within a suitable opening formed in one side wall of the tray receiving groove adjacent one of the drive gears of the indexing mechanism. In the preferred embodiment, the retaining means comprises a bracket having at least two lips which are adapted to engage and support the edge of one of the slide trays disposed within the tray receiving groove to hold same in a position, whereby the indexing rack of said tray is in operative engagement with one of the drive gears. A biasing member such as a helical compression spring is disposed within the retainer opening of the wall in contact with the innermost end of the bracket to bias the same into the tray receiving groove. The camming means formed on the retainer can be in the form of two angular cam surfaces disposed on the edge of the bracket adjacent the support lips. The cam surfaces are adapted to be engaged by the leading edge of the second tray to push the retainer bracket out of the tray receiving groove upon installation of the second tray into such groove.

The foregoing and other features of the slide projector of the invention are more fully described with references to the annexed drawings.

DESCRIPTION OF THE PREFERRED EMBODIMENTS

Figure 1:
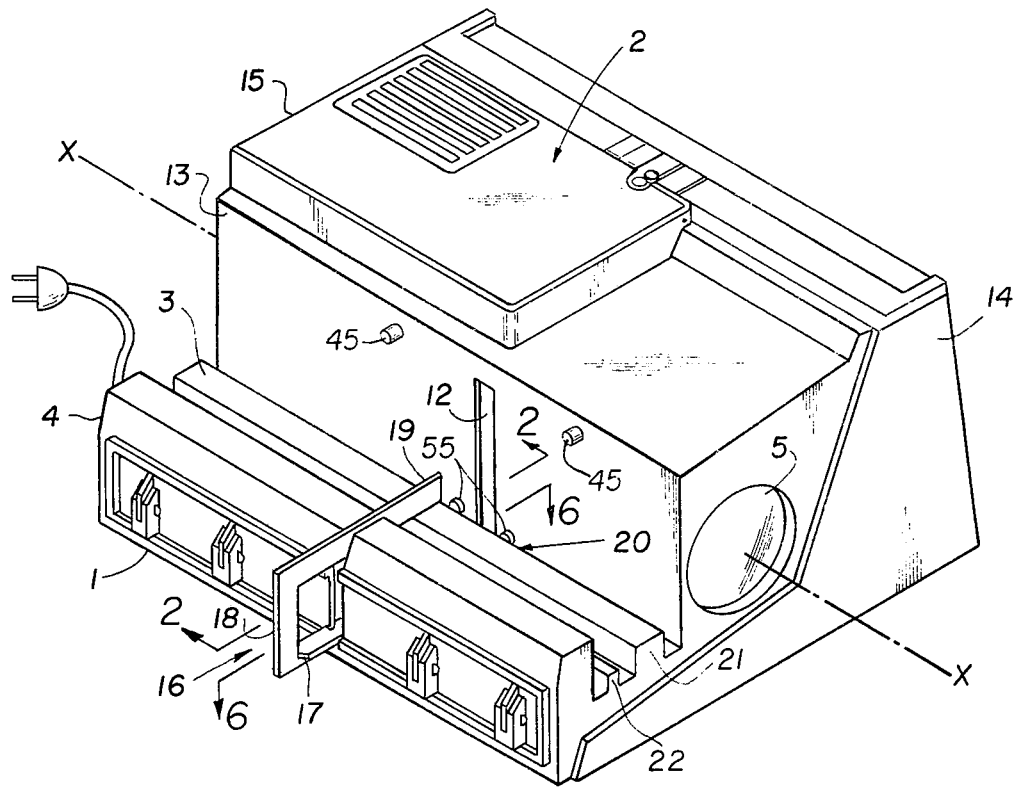
FIG. 1 is a perspective view of the slide projector of the invention.

Referring to FIG. 1, the slide projector of the present invention includes a base plate 1 and a projector housing 2 to fit thereon. The housing 2 is provided with a slide tray receiving groove 3 defined by walls 4 and 13, and which extends along one side thereof and is open at the top, front and rear ends, for alternately receiving several alternate interchangeable slide trays, as hereinafter described, in which a plurality of slides may be stored.

The optical axis of the projector is indicated by a broken line x—x in FIG. 1, and as is well known in the art a lamp condenser lens (not shown) and focusing lenses 5 are disposed in the projector housing 2 in line with said optical axis. A vertically extending slide receiving aperture 12 is formed in vertical wall 13 of slide receiving groove 3 approximately midway between the front wall 14 and the rear wall 15 of the projector housing 2, to permit the transfer of slides from one of the interchangeable slide trays disposed in groove 3 to a viewing position in the projector and the return of the slides from the viewing position to the slide tray.

A slide carrier 16 is mounted for reciprocal sliding movement transversely of the optical axis x—x and is adapted for transferring slides between a slide tray disposed in groove 3 and the viewing aperture 12 in the projector. The slide carrier 16 is characterized by an elongated base member 17 supported for sliding movement within the base plate 1 of the projector, a handle 18 which extends upwardly from the outer end of base member 17, a pusher arm 19 which extends inwardly from the upper end of the handle towards the optical axis x—x of the projector in a parallel spaced arrangement above the base member 17, and by a vertically disposed plate member (not shown) which is secured by suitable fastening means to the opposite end of base number 17 for returning slides to a slide tray. Details of the slide carrier of the type embodied in the projector disclosed herein are more fully described in U.S. Pat. No. 3,183,774 to Kurz.

When the slide carrier is inserted inwardly from its outermost position, the innermost end of the pusher arm 19 engages a slide stored in the selected slide tray so as to transfer the same from such slide tray through the vertical slide aperture 12 to the viewing position in the projector on the optical axis. The slide is returned from its viewing position in the projector upon the outward withdrawal of the slide carrier 16 from its innermost position. After the slide carrier has returned the previously viewed slide to the slide tray, the slide tray is automatically advanced by the indexing means, which is hereinafter described, to present the next slide in the tray for viewing.

Figure 2:
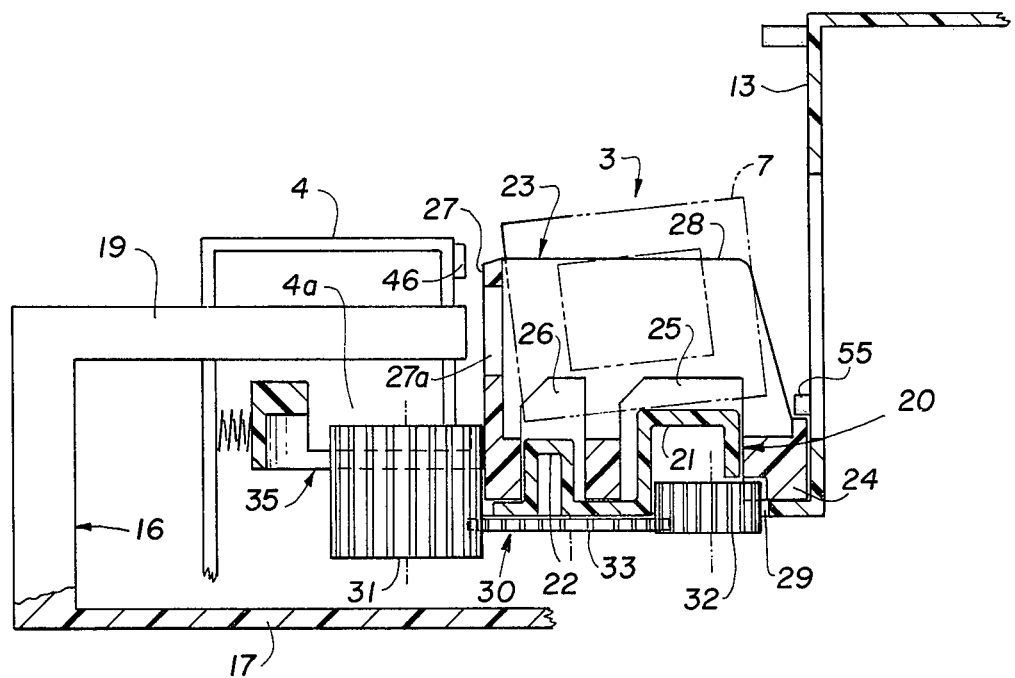
FIG. 2 is a partial cross-sectional view transverse to the optical axis of the projector taken along the lines 2—2 of FIG. 1 and including a box type slide tray disposed within the slide tray receiving groove.
Figure 6:
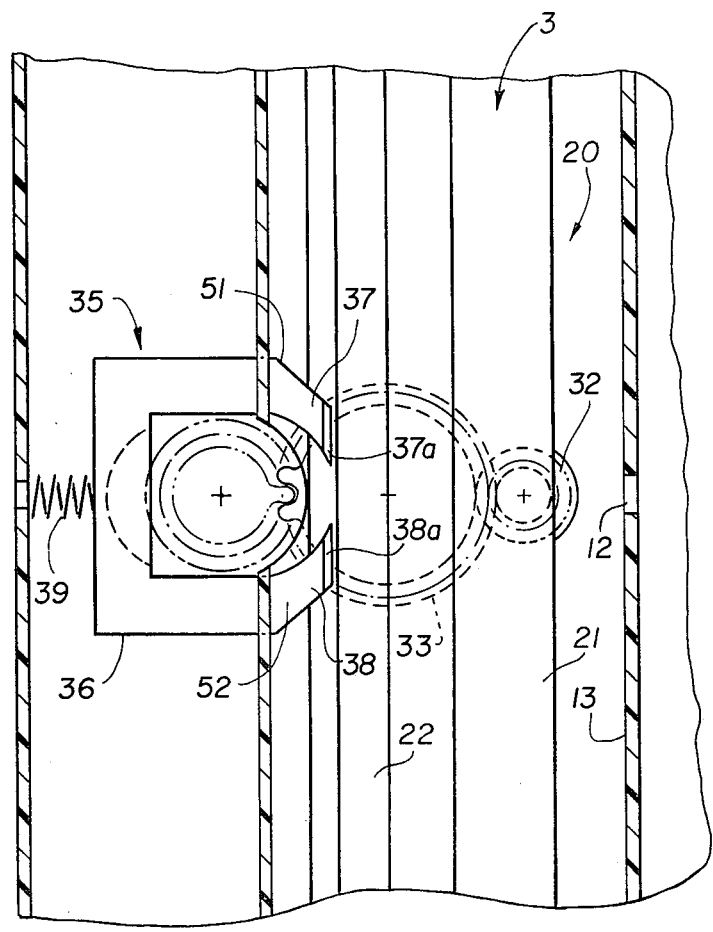
FIG. 6 is a partial cross-sectional view taken along the lines 6—6 of FIG. 1, showing the tray retainer means.

As shown in FIG. 2, a tray guide means 20 is disposed along the base of slide tray receiving groove 3. The tray guide means has a contoured surface which includes two upstanding elongated ribs 21 and 22, which ribs extend along the base of tray receiving groove 3, as shown in FIG. 6. Ribs 21 and 22 are adapted to slidably engage corresponding grooves and/or support surfaces of the several different types of slide trays that can be alternately installed in the projector. A box type tray 23, which is disposed within slide tray receiving groove 3 of FIG. 2, comprises a lower wall 24 having a pair of elongated grooves 25 and 26 formed therein adapted to slidably engage ribs 21 and 22, respectively, a side wall 27 connected to lower wall 24 and having a series of vertically disposed spaced slots 27a formed therein, and transverse partitions 28 attached to side wall 27 and lower wall 24, uniformly spaced from each other by a distance approximately equal to the thickness of a slide 7 disposed therein to define a plurality of slide receiving spaces, each being in alignment with a slot 27a in wall 27 to permit entry of pusher arm 19 to transport slides from tray 23 to the viewing position. A rack of uniformly spaced indexing teeth 29 is formed in lower wall 24 extending along the peripheral edge of groove 25. Each tooth formed in rack 29 corresponds to a slide receiving space in tray 23.

Figure 3:
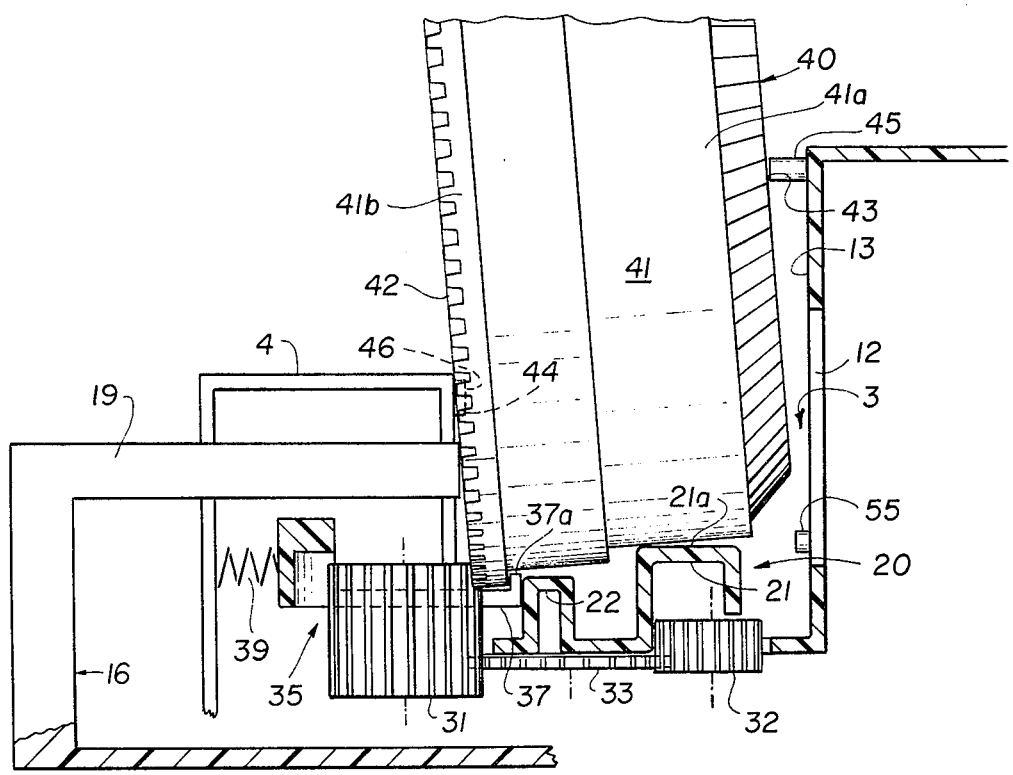
FIG. 3 is another partial cross-sectional view showing the same section as in FIG. 2, but including therein a circular slide tray.
Figure 4:
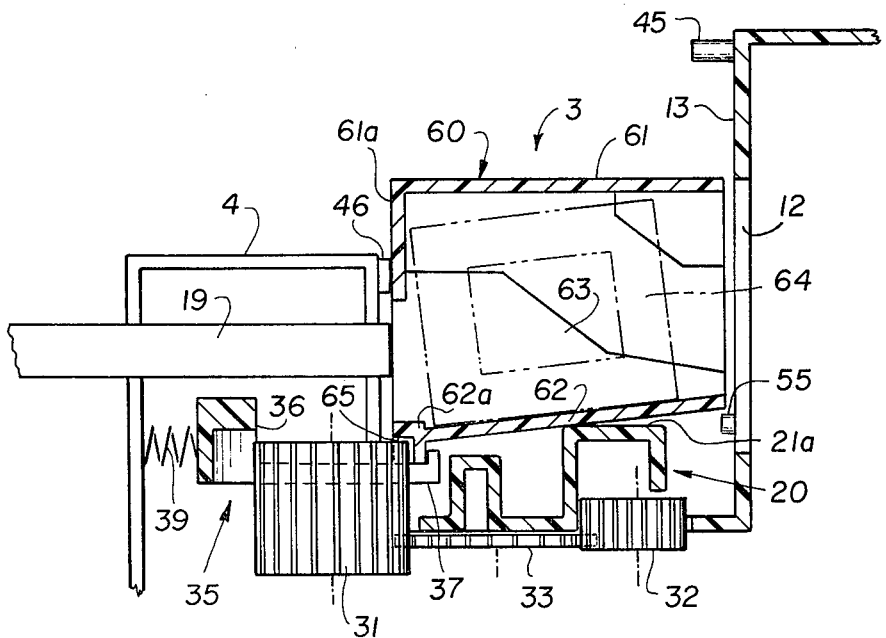
FIG. 4 is another partial cross-sectional view showing the same area as in FIGS. 2 and 3, and including therein a second type of box tray.

An indexing mechanism 30 is disposed beneath tray guide means 20, and comprises a first drive gear 31 for engaging and incrementally advancing the slide trays shown in FIGS. 3 and 4, a second drive gear 32 for engaging indexing teeth 29 to incrementally advance slide tray 23 from one slide position to the next, and an intermediate gear 33 operatively connecting gears 31 and 32. An indexing member, including an upstanding pawl of well known design (not shown), in operative engagement with base member 17 of slide carrier 16 is adapted to engage drive gear 31 upon the withdrawal of slide carrier 16 from the projector so as to incrementally rotate gear 31 and thereby advance a slide tray disposed within groove 3.

A slide tray retainer assembly 35, which will be described hereinafter with reference to FIGS. 3, 4 and 6, is slidably disposed within an opening 4a in sidewall 4 of tray receiving groove 3, and is held within such opening by its engagement with tray 23.

FIG. 3 illustrates the same embodiment of the invention as shown in FIG. 2. However, in this instance a circular slide tray 40 is vertically disposed for rotational movement within tray receiving groove 3. Tray 40 comprises cylindrical outer surface 41 having a stepped section 41a adapted to slidably engage the top surface 21a of rib 21 formed in the tray guide means 20. In addition, tray 40 includes a plurality of radially disposed slide receiving spaces (not shown), and a rack of uniformly spaced indexing teeth 42 formed along the outer peripheral edge of cylindrical surface 41. Each of the teeth in rack 42 corresponds to a slide receiving space disposed within the tray and are adapted for engagement with drive gear 31. Tray 40 also includes a first annular bearing surface 43 formed on one side thereof, and a second annular bearing surface 44 formed on the other side thereof. A projection 45 extends from sidewall 13 from tray receiving groove 3 and is adapted to slidably engage annular surface 43. Similarly, a pair of projections 46 (only one shown) are disposed on side wall 4 of tray receiving groove 3 and are adapted to slidably engage annular bearing surface 44. Cylindrical surface 41 also includes a second stepped lip section 41b formed adjacent indexing rack 42. Retainer assembly 35 is adapted to engage lip section 41b to hold rack 42 in engagement with drive gear 31. The combination of the retainer assembly 35, supporting surface 21a of guide means 20, and projections 45 and 46 served to support and rotatably guide slide tray 40 within tray receiving groove 3.

Referring now to FIG. 6 it can be seen that retainer assembly 35 comprises a generally C-shaped bracket 36 slidably disposed within opening 4a of wall 4. Bracket 36 includes a first finger 37 terminating in an upstanding retaining lip 37a, and a second finger 38 terminating in an upstanding retaining lip 38a. A helical compression spring 39 is disposed within opening 4a in engagement with the trailing end of bracket 36 to bias the bracket into the tray retaining position within the tray receiving groove 3 as shown in FIGS. 3 and 4. A pair of angularly disposed cam surfaces 51 and 52 are formed along the edges of fingers 37 and 38, respectively. The cam surfaces are adapted to be engaged by slide tray 23, as shown in FIG. 2, and slide tray 50 as shown in FIG. 5 to automatically push bracket 36 into an inoperative position out of tray receiving groove 3 upon insertion of either tray 23 or tray 50 into the tray receiving groove.

FIG. 4 illustrates the projector of the invention with an elongated box type slide tray 60 slidably disposed within the tray receiving groove 3. Slide tray 60 comprises an upper wall 61 and a lower wall 62 connected together by transverse partitions 63 uniformly spaced from each other by a distance approximately equal to the thickness of a slide 64 disposed therein. Lower wall 62 includes a stepped edge portion 62a terminating in a rack of uniformly spaced indexing teeth 65 having the same pitch as indexing teeth 42 on tray 40, each of which corresponds to a slide receiving space defined by partitions 63. As shown, tray 60 is supported within slide tray receiving groove 3 by the engagement of lower wall 62 with surface 21a of the tray guide means 20 and by the engagement of retainer lips 37a and 38a of retainer bracket 36 with stepped portion 62a of the lower wall 62. In addition, projections 46 formed on wall 4 are adapted to slidably engage and support a corresponding sidewall 61a of tray 60. It can be seen that the retainer assembly 35 holds tray 60 in a position whereby indexing rack 65 is in operative engagement with drive gear 31, so that such gear upon rotation thereof may incrementally advance tray 60 from one slide position to the next.

Figure 5:
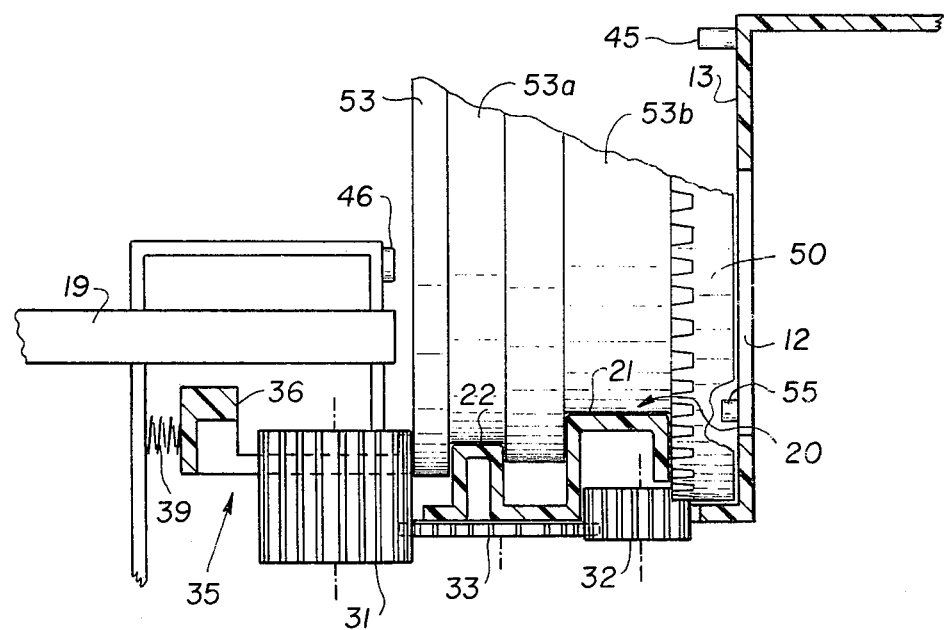
FIG. 5 is still another partial cross-sectional view similar to FIG. 2, but including therein a second type of circular slide tray.

FIG. 5 illustrates the use of the projector of the invention with a circular slide tray 50 having the same indexing and support configuration as box tray 23 shown in FIG. 2. Tray 50 comprises a cylindrical outer case 53 having a pair of support and guide grooves 53a and 53b formed therein. A rack of indexing teeth 54 having the same pitch as the teeth in indexing rack 29 formed on tray 23 is disposed along one peripheral edge of groove 53b. Grooves 53a and 53b are adapted to slidably engage ribs 22 and 21, respectively, of tray guide means 20 and rack 54 is adapted to operatively engage drive gear 32. In addition, a pair of spaced support lugs 55 (only one shown) extend from wall 13 of tray receiving groove 3, to slidably engage the outer periphery of tray 50 to support the same and hold rack 54 in engagement with drive gear 32.

As shown in the drawings, projections 46 are positioned in a manner to support and guide box tray 40 or circular tray 60 within the tray receiving groove 3, and in no way interfere with the operation of trays 23 and 50, when either of such trays are disposed within groove 3. Similarly, projection 45 and lugs 55 support and guide trays 40 and 50, respectively, but do not contact trays 23 and 60. In addition, projection 45 fits within an opening formed in the side of slide tray 50 and does not contact the same, and support lugs 55 do not engage slide tray 40.

In operation, to install the desired interchangeable slide tray within the tray receiving groove, slide carrier 16 is first withdrawn from the projector to provide access to tray receiving groove 3 and the desired tray is inserted therein. In the case of trays 40 and 60 retainer assembly 35 is biased into a supporting position within the tray receiving groove to support the edge of such trays to maintain the engagement of the indexing racks formed therein with drive gear 31. In the case of slide trays 23 and 50, the engagement of the edge of such trays with camming surfaces 51 and 52 urges retainer assembly 35 into an inoperative position out of the tray receiving groove. Once the desired tray has been installed within the projector, normal operation can then be commenced. The reciprocating movement of slide carrier 16 advances slides to and from the selected slide tray and also causes incremental rotation of drive gear 31 so as to advance such tray to the next slide position.

Figure 7:
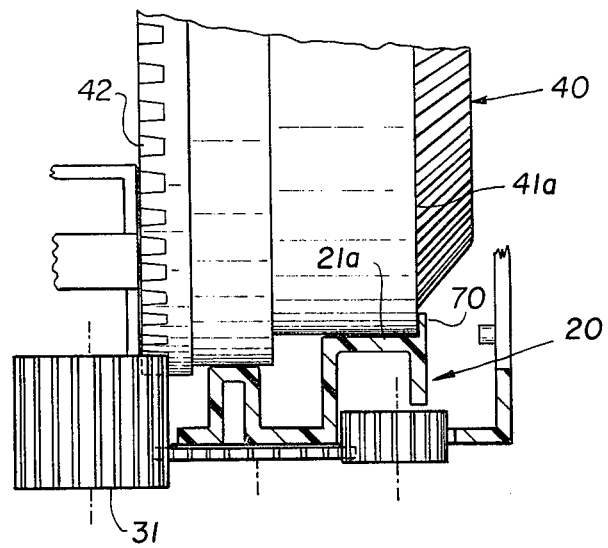
FIG. 7 is a partial cross-sectional view similar to FIG. 3 and showing an alternative tray retaining means for one circular tray.
Figure 8:
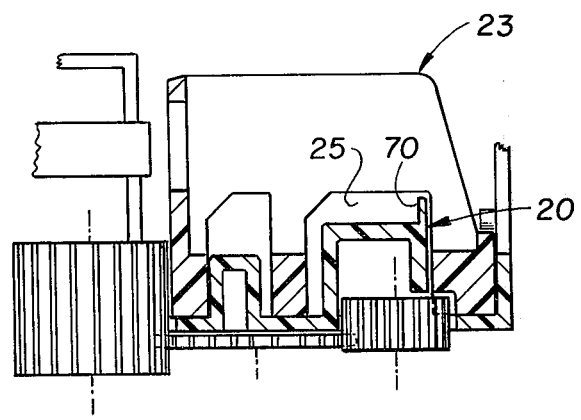
FIG. 8 is a partial cross-sectional view similar to FIG. 7 showing the non-engagement of the alternate tray retaining means with one box-type tray.

FIG. 7 and 8 illustrate an alternative embodiment of the tray retaining means. An upstanding lip or rib 70 is formed along the outer edge of flat support surface 21a of tray guide means 20. As shown in FIG. 7, lip 70 is adapted to engage the edge of stepped portion 41a of circular tray 40 in a manner so as to hold indexing rack 42 thereof in engagement with gear 31, thus eliminating the need for tray retaining means 35. It can be seen in FIG. 8 that lip 70 engages groove 25 of tray 23 and thereby does not interfere with the operation of tray 23. It should also be noted that the use of lip 70 further eliminates the need for projections 45 and 46, since tray 40 in the embodiment of FIG. 7 does not rest on the side walls of the tray receiving groove.

The embodiments described hereinabove are included for illustrative purposes only and are in no way intended to limit the scope of the invention. Additional modifications of the instant projector so that it may accommodate additional slide trays having other configurations, which embodiments fall within the scope of this invention will be apparent to those skilled in the art.

What is claimed is:

1. In a slide projector of the type including a slide tray receiving groove formed by first and second side walls for holding a slide tray having a plurality of spaced apart slide receiving spaces, and a slide carrier slidably disposed for reciprocating movement transversely to the slide tray receiving groove for transferring a slide from a slide tray installed therein to the viewing position on the optical axis of the projector and returning the same to the slide tray, the improvement comprising means for alternately receiving within the slide tray receiving groove at least four slide trays having different shapes and indexing racks of different configurations, said racks located adjacent one or the other of said side walls of said groove including tray guide means fixedly disposed within the slide tray receiving groove and having a contoured surface corresponding to and adapted to slidably engage, support and guide the alternate slide trays; and an indexing mechanism for incrementally advancing said alternate slide trays disposed within the slide tray receiving groove to sequentially present slides contained in said slide trays for viewing; said indexing mechanism including a first rotatable drive gear adapted to engage and advance the indexing rack of one of said alternate trays in which the indexing rack is located adjacent said first side wall of said groove, and a second rotatable drive gear having its longitudinal axis spaced from the longitudinal axis of said first gear and adapted to engage and advance the alternate tray in which the indexing rack is located adjacent the second side wall of said groove of the other of said alternate trays.

2. A slide projector in accordance with claim 1 wherein said longitudinal axes of said first and second rotatable drive gears and arranged in spaced parallel relationship, and wherein said first and second rotatable drive gears are operatively linked together.

3. In a slide projector of the type including a slide tray receiving groove for holding a slide tray having a plurality of spaced apart slide receiving spaces, and a slide carrier slidably disposed for reciprocating movement transversely to the slide tray receiving groove for transferring a slide from a slide tray installed therein to the viewing position on the optical axis of the projector and returning the same to the slide tray, the improvement comprising means for alternately receiving within the slide tray receiving groove at least two slide trays having different shapes and indexing racks of different configurations, including tray guide means fixedly disposed within the slide tray receiving groove and having a contoured surface correspondingly to and adapted to slidably engage, support and guide either of the alternate slide trays; and an indexing mechanism for incrementally advancing either of said alternate slide trays disposed within the slide tray receiving groove to sequentially present slides contained in either of said slide trays for viewing; said indexing mechanism including a first rotatable drive gear adapted to engage and advance the indexing rack of one of said alternate trays, and a second rotatable drive gear having its longitudinal axis spaced from the longitudinal axis of said first gear and adapted to engage and advance the indexing rack of the other of said alternate trays, further comprising tray retaining means slidably disposed for movement perpendicular to the direction of movement of the alternate slide trays between an inoperative position out of the slide tray receiving groove and a retaining position within the tray receiving groove to support the edge of one of said alternate trays to maintain the indexing rack thereof in engagement with the first drive gear; and retaining means being normally biased into the support position within the tray receiving groove, and including camming means for engagement with the other of said alternate trays to urge such retaining means into the inoperative position upon insertion of said other alternate tray into the slide tray receiving groove.

4. A slide projector in accordance with claim 3, in which the retaining means comprises a bracket having at least two lips which are adapted to engage and support the edge of one of the alternate slide trays disposed within the slide tray receiving groove to hold the same in a position whereby the indexing rack of said tray is in operative engagement with one of said drive gears.

5. A slide projector in accordance with claim 4, in which the camming means formed on the retaining means is in the form of two annular cam surfaces formed on the edge of the bracket adjacent the support lips, which surfaces are adapted to be engaged by the leading edge of said other alternate slide trays to push the bracket out of the tray receiving groove upon installation of other tray into the slide tray receiving groove.

6. In a slide projector of the type including a slide tray receiving groove for holding a slide tray having a plurality of spaced apart slide receiving spaces, and a slide carrier slidably disposed for reciprocating movement transversely to the slide tray receiving groove for transferring a slide from a slide tray installed therein to the viewing position on the optical axis of the projector and returning the same to the slide tray, the improvement comprising means for alternately receiving within the slide tray receiving groove at least two slide trays having different shapes and indexing racks of different configurations, including tray guide means fixedly disposed within the slide tray receiving groove and having a contoured surface corresponding to and adapted to slidably engage, support and guide either of the alternate slide trays; and an indexing mechanism for incrementally advancing either of said alternate slide trays disposed within the slide tray receiving groove to sequentially present slides contained in either of said slide trays for viewing; and indexing mechanism including a first rotatable drive gear adapted to engage and advance the indexing rack of one of said alternate trays, and a second rotatable drive gear having its longitudinal axis spaced from the longitudinal axis of said first gear and adapted to engage and advance the indexing rack of the other of said alternate trays, said alternate slide trays comprising a first slide tray having a smooth supporting surface and a rack of indexing projections disposed along one peripheral edge thereof and a second slide tray having a supporting surface with at least one guide groove formed therein and a rack of indexing projections disposed along the inner edge of said groove having a pitch different from the pitch of the indexing rack of said first slide tray; and in which said tray guide means comprises at least one upstanding projection adapted to slidably engage the guide groove formed in said second tray, and a flat supporting surface disposed along the top of said projection to engage the supporting surface of said first tray.

7. A slide projector in accordance with claim 6, in which the first slide tray has a circular configuration and is adapted to be vertically disposed within the slide tray receiving groove.

8. A slide projector in accordance with claim 6, in which the first slide tray has a box-type configuration and is adapted to be horizontally disposed within the slide tray receiving groove.

9. A slide projector in accordance with claim 6, in which the second slide tray has a circular configuration and is adapted to be vertically disposed within the slide tray receiving groove.

10. A slide projector in accordance with claim 6, in which the second slide tray has a box-type configuration and is adapted to be horizontally disposed within the slide tray receiving groove.

11. A slide projector adapted to alternately receive and incrementally advance at least two slide trays having different shapes and different indexing configurations comprising, in combination, a slide tray receiving groove for alternately holding a first slide tray having a smooth supporting surface and a rack of indexing projections disposed along one peripheral edge thereof, and a second slide tray having a supporting surface with at least one guide groove formed therein and a rack of indexing projections formed along the inner edge of said groove, which rack of indexing projections has a pitch different from the pitch of the indexing rack of said first slide tray; said tray receiving groove including tray guide means having at least one upstanding projection adapted to slidably engage the guide groove formed in said second tray, and a flat surface disposed along the top of said projection to engage the supporting surface of said first tray; and an indexing mechanism for incrementally advancing either said first or said second tray within said tray receiving groove to sequentially present slides contained in said first or said second trays for viewing, including a first rotatable drive gear adapted to engage and advance the indexing rack of said first tray, and a second rotatable drive gear operatively linked to said first drive gear and adapted to engage and advance the indexing rack of said second tray.

12. A slide projector in accordance with claim 11, further comprising tray retaining means slidably disposed for movement perpondicular to the direction of movement of the first and second slide trays between an inoperative position out of the tray receiving groove, and a support position within the tray receiving groove to support the edge of the first tray to maintain the indexing rack thereof in engagement with the first drive gear; and retaining means being normally biased into the support position, and including camming means for engagement with the second tray to urge the retaining means into the inoperative position upon the insertion of said second tray into the tray receiving groove.

13. A slide projector in accordance with claim 12, in which the retaining means comprises a bracket having at least two lips which are adapted to engage and support the edge of the first slide tray to hold the same in a position whereby the indexing rack of said tray is in operative engagement with said first drive gear.

14. Slide projector in accordance with claim 3, in which the camming means formed on the retaining means comprises two angular cam surfaces disposed on the edge of the bracket adjacent the support lips, which surfaces are adapted to be engaged by the leading edge of said second tray to urge the retaining bracket out of the tray receiving groove upon installation of the second tray into such groove.

15. In a slide projector of the type including a slide tray receiving groove for holding a slide tray having a plurality of spaced apart slide receiving spaces, and a slide carrier slidably disposed for reciprocating movement transversely to the slide tray receiving groove for transferring a slide from a slide tray installed therein to the viewing position on the optical axis of the projector and returning the same to the slide tray, the improvement comprising means for alternately receiving within the slide tray receiving groove at least two slide trays having different shapes and indexing racks of different configurations, including tray guide means fixedly disposed within the slide tray receiving groove and having a contoured surface corresponding to and adapted to slidably engage, support and guide either of the alternate slide trays; and an indexing mechanism for incrementally advancing either of said alternate slide trays dispersed within the slide tray receiving groove to sequentially present slides contained in either of said slide trays for viewing; said indexing mechanism including a first rotatable drive gear adapted to engage and advance the indexing rack of one of said alternate trays and a second rotatable drive gear having it longitudinal axis spaced parallel from the longitudinal of said first gear, and wherein said first and second rotatable drive gears are operatively linked together by a third gear having a longitudinal axis in spaced parallel relationship to the longitudinal axis of said first and second drive gears and intermediate said gears.

* * * * *

UNITED STATES PATENT OFFICE
CERTIFICATE OF CORRECTION

Patent No. 3,950,087          Dated April 13, 1976

Inventor(s) Jean-Paul Erchoff

It is certified that error appears in the above-identified patent and that said Letters Patent are hereby corrected as shown below:

Column 2, line 15, change "comtem-" to "contem-";
Column 7, line 63, delete "box";
Column 7, line 64, delete "circular";
Column 9, line 11, change "and" to "are";
Column 9, line 47, change "and" to "said";
Column 9, line 64, change "annular" to "angular";
Column 10, line 22, change "and" to "said";

Column 11, line 25, change "and" to "said";
Column 11, line 36, change "3" to "13";

Signed and Sealed this

Twelfth Day of October 1976

[SEAL]

Attest:

RUTH C. MASON
Attesting Officer

C. MARSHALL DANN
Commissioner of Patents and Trademarks